Patented Dec. 8, 1931

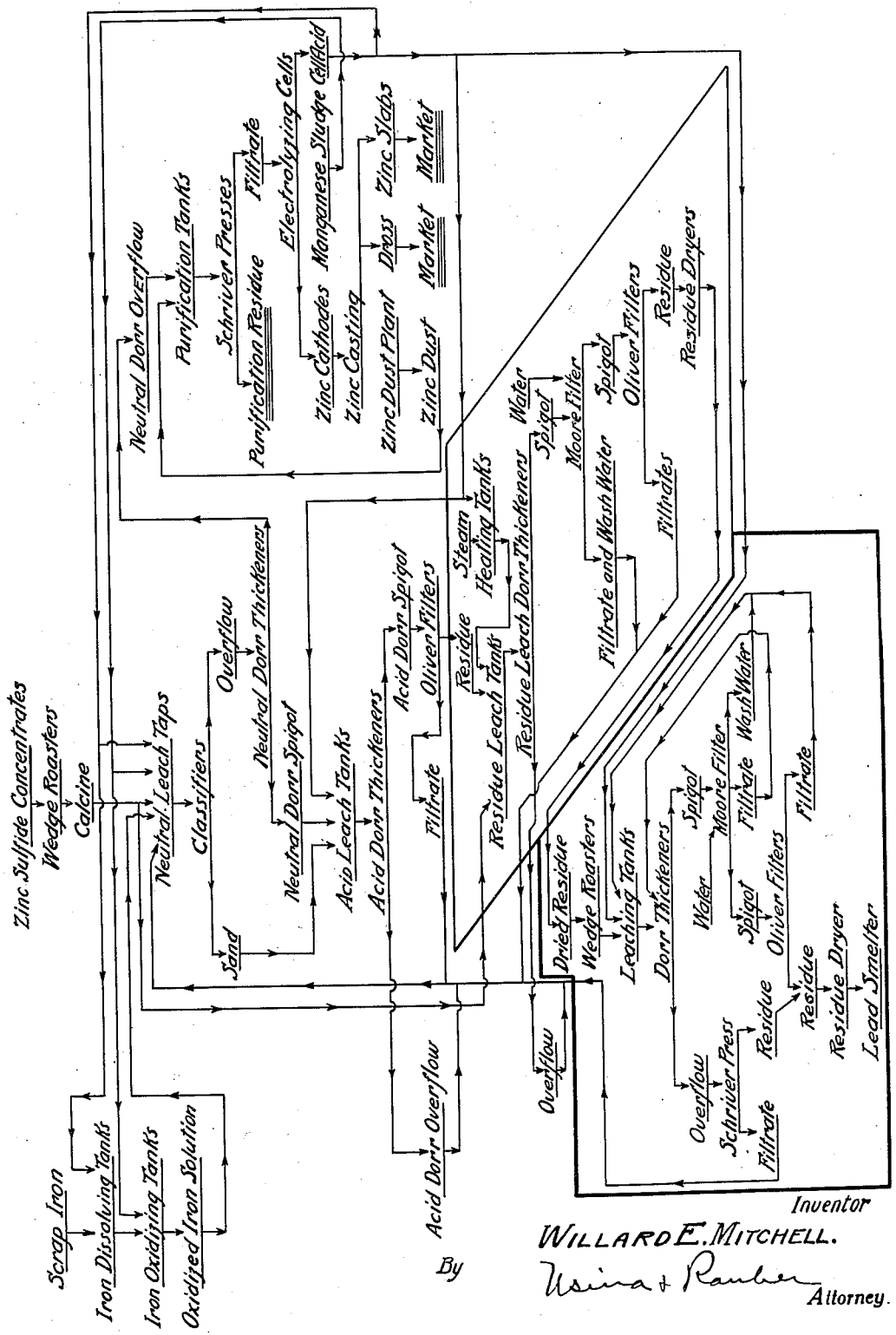

1,834,960

UNITED STATES PATENT OFFICE

WILLARD E. MITCHELL, OF GREAT FALLS, MONTANA, ASSIGNOR TO ANACONDA COPPER MINING COMPANY, A CORPORATION OF MONTANA

TREATING ZINC CONCENTRATE AND PLANT RESIDUE

Application filed April 25, 1930. Serial No. 447,123.

In roasting zinc concentrates, the zinc sulphide is changed into zinc oxide which is soluble in dilute sulphuric acid.

If the concentrate contains any iron, this will be converted into ferric oxide during the roasting process. Under certain conditions always existing with the present roasting practice, a reaction takes place between the oxides of zinc and iron, with the formation of a compound named zinc ferrate or zinc ferrite, generally considered to have the composition $ZnOFe_2O_3$. This compound, which is always present in commercial zinc calcines, is practically insoluble in cold, dilute sulphuric acid, and represents a loss of zinc in the leaching operation, as well as an extra expense in the subsequent blast furnace treatment of the residue for the recovery of lead, silver and gold.

According to the present invention, the treatment is modified so as to increase the zinc recovery and to restrict the quantity of zinc (an objectionable element in the subsequent blast furnace treatment) in the residue. For this purpose certain supplementary leaching and roasting operations are provided as described in the following description of the complete process.

The ore or concentrate is roasted in a furnace in an atmosphere of air at a suitable temperature to convert as much as possible of the insoluble zinc sulphide to soluble zinc oxide and zinc sulphate. This treatment is termed the "oxidizing roast".

The roasted or calcined material is delivered to the first or neutral leach where it meets a flow of partly neutralized electrolyte. In this leach the calcine and partly neutralized electrolyte are agitated to complete neutralization and are then passed to the "neutral classifiers", where the coarse solids are separated from the liquid and delivered to the "acid leach".

From the neutral classifier, the liquid passes to the neutral thickeners, where the fine solids and slimes are separated from it and are also delivered to the acid leach.

From the neutral thickeners the solution passes to the zinc dust purification where the copper, cadmium and other impurities present are precipitated by the addition of fine zinc dust. Following the zinc dust purification, the solution is passed to the filters where it is clarified.

The clarified solution, now termed "purified solution" is next fed to electrolytic cells where zinc is deposited and the acid solvent regenerated.

The acid solvent, termed "cell acid return", is divided into three parts. One part goes to the mechanical acid leach, hereinafter described. Another part goes to the acid leach where it meets the coarse solids from the neutral classifiers and the fine solids and slimes from the neutral thickeners. The acid is agitated with these materials until almost neutral (.1 to 1.0% $H_2SO_4$) and is finally separated from the residual materials in the "acid thickeners".

The third part of the cell acid return is mixed with the acid leach solution and the solution returned from the mechanical acid leach, and then passes to the neutral leach where it is neutralized by fresh calcine, thus again starting the cycle of the process.

The residual material from the acid thickeners is the raw material for the mechanical acid leach. 100 tons of calcine, assaying 60% Zn, produce approximately 40 tons of acid leach residue assaying about 18% Zn., 50% of which is water soluble.

The specific characteristics of the mechanical acid leach which adapt it to this process, aside from leaching zinc oxide, are, first, that it dissolves large amounts of ferric iron, a considerable portion of which comes from ferrates, insoluble in the preceding leaching steps, and, second, that it causes this ferric iron to be precipitated to a large extent as basic sulphates.

The probable chemical reactions of this latter effect are:

$Fe_2(SO_4)_3 + 2H_2O = Fe_2O_2SO_4 + 2H_2SO_4$
$Fe_2(SO_4)_3 + H_2O = Fe_2O(SO_4)_2 + H_2SO_4$

The method of operating the mechanical acid leach is to fill a leaching tank about two-thirds full of cell acid return, containing 100 to 120 grams of free $H_2SO_4$ per liter, heated to 80 or 90 degrees centigrade. To this hot acid is added residue from the acid thickeners until the $H_2SO_4$ content is neutralized down to 30 or 50 grams of free $H_2SO_4$ per liter. The charge is next agitated for a period of 8 to 16 hours. At the end of this period the solution assays 15 to 20 grams per liter iron and 15 to 20 grams of free $H_2SO_4$ per liter. Any ferrous iron dissolved is oxidized by the addition of manganese dioxide or other oxidizing agent. The next step consists of adding a small amount of fresh zinc calcine or other basic material in such a manner that the iron is precipitated slowly in a solution constantly saturated with respect to the above mentioned basic sulphates, which sulphates are insoluble in a slightly acid solution.

In order to accomplish this purpose, the calcine must be added slowly, for if it is added rapidly, the free $H_2SO_4$ is neutralized so quickly that the solution becomes saturated with respect to ferric hydroxide, and this hydroxide will be precipitated in place of the basic sulphates.

The leach is finished when the solution contains only 1 gram of free $H_2SO_4$ per liter and 0.2 to 0.3 grams of iron per liter and is then discharged to the mechanical acid leach thickeners. The solution from the thickeners is returned to the first or neutral leach, as mentioned above, while the thickened solids are washed to recover any entrained zinc sulphate, dewatered and dried down to 12% or 18% moisture content preparatory to the next or "residue retreatment" process. 100 tons of calcine, assaying 60% Zn, produce about 25 to 30 tons of mechanical acid leach residue, assaying 9% to 12% Zn, 20% to 30% of which Zn is water soluble, and about 4% S as basic sulphates.

In the residue retreatment process the mechanical acid leach residue is roasted at a temperature of 500 to 600° centigrade, in any ordinary type of roaster, as, for example, a Wedge roaster.

Successful operation depends upon two facts: first, that the basic iron sulphates mentioned above start to decompose at about 480° centigrade, yielding $SO_3$ gas and ferric oxide according to the chemical representation:

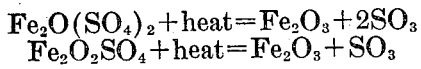

and second, the fact that under 650° centigrade the liberated $SO_3$ gas will react with free zinc oxide (resulting from the burning of any zinc sulfide present) and with zinc oxide combined with ferric oxide in ferrates, forming water soluble zinc sulphate.

The method of conducting the roasting operation is to maintain a uniform flow of material through the roaster and so control the heat that a maximum temperature of 650° centigrade is reached.

For any given rate of flow of material through the furnace there is an optimum temperature. If the raw material contains insufficient basic sulfates to furnish the required $SO_3$, ferric sulfate may be added at any point in the leaching system which will correspondingly increase the basic sulfates; or, the gases from concentrate roasters, containing $SO_2$ gas, may be passed through the residue roasters. In this latter case the ferric oxide resulting from the decomposition of basic sulfates will act as a catalyst in the formation of $SO_3$ from the $SO_2$.

100 tons of mechanical acid leach residue, assaying 9 to 12% Zn and 4% S as basic sulfates, produce about 84 tons of roasted residue assaying 10 to 14% Zn, 70 to 85% of which Zn is water soluble.

This roasted residue is now cooled and leached with water or any leaching plant solution. The resulting leach residue is then washed, dewatered, dried, and shipped to a lead smelter. 100 tons of mechanical acid leach residue produce about 75 tons of the final leached and washed residue assaying about 5% Zn, 40 to 50% of which Zn may be water soluble. The leach solution from this operation is returned together with the leach solutions from the acid leach and from the mechanical acid leach, to the first or neutral leach.

Some of the impurities contained in the acid leach residue, such as copper, cadmium, arsenic, antimony, cobalt, manganese, germanium, and other impurities, are extracted along with zinc in the mechanical acid leach and in the residue retreatment process. A portion of each of these impurities is precipitated when the two resulting solutions are neutralized in the first or neutral leach. That portion of these impurities which is not precipitated is later removed in the zinc dust purification referred to above. The portion which is precipitated is recirculated through the acid leach, mechanical acid leach and residue retreatment processes. It is essential that these processes be so regulated that a balance is maintained between the total amount of these individual impurities in the neutral leach residue and in the final residue from the residue retreatment step.

The term "neutral leach" as used above means a leach which ends substantially neutral; and the terms "acid leach" similarly refers to a leach which ends acid.

The accompanying drawing is a flow sheet showing the complete set of operations for the leaching plant, the part blocked off in the light line shows the mechanical acid leach and incidental portions. The following part, marked off in the heavy line shows the operations subsequent to the mechanical leach. The balance of the sheet shows the regular leaching operation.

The essential features of these processes which I claim to be new and useful are:—

1. The process for treating zinc concentrates which consists of roasting and leaching with cold dilute sulfuric acid in a leach which ends neutral; withdrawing the leach solution from the residue and releaching this residue with fresh dilute sulfuric acid in a leach which ends acid; withdrawing this second leach solution from the residue and leaching from this second residue part of its iron and zinc content with hot sulfuric acid in a leach which ends acid, and precipitating the iron from solution as basic iron sulfates by the addition of basic material; withdrawing this third leach solution and treating the residue to a roasting operation at a temperature between that of the decomposition of the basic iron sulfates and that of zinc sulfate, so as to cause the decomposition of the former and the production of insoluble iron oxide, and to cause, also, the formation of water soluble zinc sulfate, leaching the same with water or zinc bearing solution; withdrawing this fourth leach solution, leaving a final residue adapted for blast furnace treatment and recovery of metals other than zinc.

2. The method described in claim 1, the second and third leach solutions being combined with the first to provide a solution adapted for electrolytic recovery of zinc.

3. The method described in claim 1, the second, third, and fourth leach solutions being combined with the first to provide a solution adapted for electrolytic recovery of zinc.

4. Substantially the method described in claim 1, with the addition of ferric sulfate to the leaching system at any point prior to the roasting operation.

5. Substantially the method described in claim 1, with the addition of ferric sulfate to the leaching system at any point prior to the precipitation in the third leach.

6. Substantially the method described in claim 1, with the addition of sulfur dioxide gas to the residue roasting furnace.

In witness whereof, I have hereunto signed my name.

WILLARD E. MITCHELL.